(12) United States Patent
Mizutani et al.

(10) Patent No.: US 12,534,810 B2
(45) Date of Patent: Jan. 27, 2026

(54) Al COATING LAYER-EQUIPPED STAINLESS STEEL SHEET

(71) Applicant: JFE STEEL CORPORATION, Tokyo (JP)

(72) Inventors: Akito Mizutani, Tokyo (JP); Mitsuyuki Fujisawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 560 days.

(21) Appl. No.: 18/000,128

(22) PCT Filed: Apr. 20, 2021

(86) PCT No.: PCT/JP2021/016054
§ 371 (c)(1),
(2) Date: Nov. 29, 2022

(87) PCT Pub. No.: WO2022/004100
PCT Pub. Date: Jan. 6, 2022

(65) Prior Publication Data
US 2023/0193474 A1  Jun. 22, 2023

(30) Foreign Application Priority Data
Jul. 1, 2020 (JP) .................. 2020-114356

(51) Int. Cl.
*C23C 30/00* (2006.01)
*C22C 38/02* (2006.01)
(Continued)

(52) U.S. Cl.
CPC ............ *C23C 30/005* (2013.01); *C22C 38/02* (2013.01); *C22C 38/04* (2013.01); *C22C 38/06* (2013.01); *C22C 38/40* (2013.01)

(58) Field of Classification Search
CPC ..... B32B 15/012; C23C 30/005; C22C 38/02; C22C 38/04; C22C 38/06; C22C 38/40
(Continued)

(56) References Cited

U.S. PATENT DOCUMENTS 5,981,089 A  11/1999  Imai et al.
6,197,132 B1  3/2001  Andersson-Drugge
(Continued)

FOREIGN PATENT DOCUMENTS

CN  109196131 A  1/2019
EP  3589771 B1 *  4/2023  ............... C23C 2/12
(Continued)

OTHER PUBLICATIONS

Mizutani et al., JP 2016102231 A Google Patents machine translated printed Oct. 16, 2025, Jun. 2, 2025, entire translation (Year: 2016).*
(Continued)

*Primary Examiner* — Katherine A Christy
(74) *Attorney, Agent, or Firm* — KENJA IP LAW PC

(57) ABSTRACT

An Al coating layer-equipped stainless steel sheet having a base steel sheet and an Al coating layer on a surface of the base steel sheet. In the Al coating layer-equipped stainless steel sheet, the base steel sheet is a stainless steel sheet having a thickness of 100 μm or less and a predetermined chemical composition, the Al coating layer has a thickness of 0.5 μm to 10.0 μm, and a total content of Fe and Cr at a first depth of the Al coating layer is 20 mass % to 70 mass %.

2 Claims, 4 Drawing Sheets

(51) Int. Cl.
  *C22C 38/04* (2006.01)
  *C22C 38/06* (2006.01)
  *C22C 38/40* (2006.01)
(58) Field of Classification Search
  USPC .......................................................... 428/697
  See application file for complete search history.

(56) References Cited

U.S. PATENT DOCUMENTS

| | | |
|---|---|---|
| 6,203,632 B1 | 3/2001 | Heubner et al. |
| 10,260,134 B2 | 4/2019 | Hamada et al. |
| 2001/0032687 A1 | 10/2001 | Antoni et al. |
| 2009/0022636 A1 | 1/2009 | Inaguma et al. |
| 2017/0275744 A1 | 9/2017 | Ta et al. |
| 2019/0275766 A1 | 9/2019 | Mizutani et al. |
| 2022/0056547 A1 | 2/2022 | Mizutani et al. |

FOREIGN PATENT DOCUMENTS

| | | |
|---|---|---|
| JP | H01159384 A | 6/1989 |
| JP | H02133563 A | 5/1990 |
| JP | H05283149 A | 10/1993 |
| JP | H09104962 A | 4/1997 |
| JP | 2004169110 A | 6/2004 |
| JP | 3930643 B2 | 6/2007 |
| JP | 2016102231 A * | 6/2016 |
| JP | 6687177 B1 | 4/2020 |
| WO | 2006043686 A1 | 4/2006 |
| WO | 2017208671 A1 | 12/2017 |

OTHER PUBLICATIONS

Jun. 22, 2021, International Search Report issued in the International Patent Application No. PCT/JP2021/016054.

Feb. 24, 2025, Office Action issued by the China National Intellectual Property Administration in the corresponding Chinese Patent Application No. 202180045537.8 with English language search report.

Feb. 27, 2023, the Extended European Search Report issued by the European Patent Office in the corresponding European Patent Application No. 21833108.0.

* cited by examiner

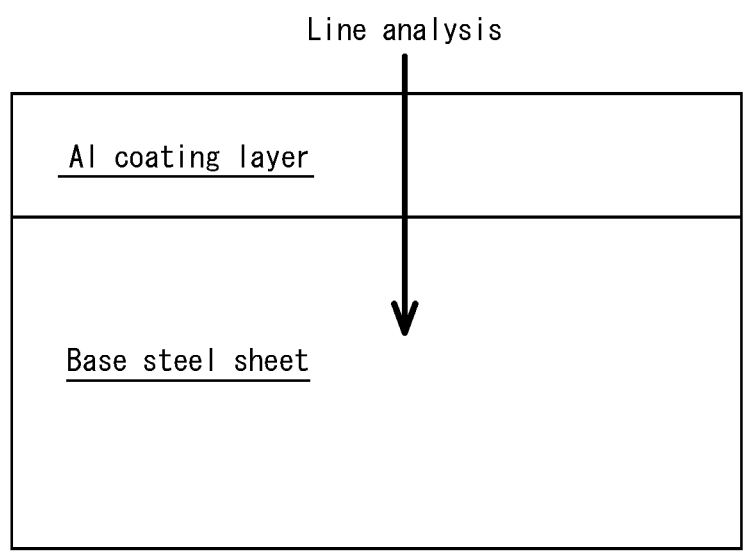

Al COATING LAYER-EQUIPPED STAINLESS STEEL SHEET

TECHNICAL FIELD

The present disclosure relates to an Al coating layer-equipped stainless steel sheet suitable as a material for producing resistance heating elements and the like.

BACKGROUND

Resistance heating is a method of heating an object by Joule heat generated when passing a current through a resistance heating element. This method has high efficiency of conversion from electrical energy to thermal energy and can be carried out by a simple control unit. Hence, the method is used in a wide range of fields such as industrial electric furnaces and electric cookers.

Resistance heating elements used in resistance heating can be divided into metallic heating elements such as Ni—Cr alloys and Fe—Cr alloys and nonmetallic heating elements such as SiC. Of these, metallic heating elements have better workability than nonmetallic heating elements, and accordingly can be worked into foil materials or wire rods. Thus, metallic heating elements can be used in thin members such as window glasses and floors, and members subjected to bending load such as gloves.

As such metallic heating elements, for example, JIS C 2520 defines three types of Ni—Cr alloys (nickel-chromium wires and rolled wires for electrical heating, type 1 to type 3) and two types of Fe—Cr alloys (iron-chromium wires and rolled wires for electrical heating, type 1 to type 2) as alloy wires for electrical heating and alloy rolled wires for electrical heating. Ni—Cr alloys are Ni-based alloys whose main additive elements are Cr: 15% to 21% and Si: 0.75% to 3% (where "%" used in relation to each element is mass %, the same applying hereafter). Fe—Cr alloys are Fe-based alloys whose main additive elements are Cr: 17% to 26%, Al: 2% to 6%, and Si: 1.5% or less.

Of these, Fe—Cr alloys, in particular stainless steel sheets having high Al content (hereafter also referred to as "Al-containing stainless steel sheets"), have excellent oxidation resistance at high temperature and are less expensive than Ni—Cr alloys. Al-containing stainless steel sheets are therefore widely used as resistance heating elements.

As techniques relating to such Al-containing stainless steel sheets, for example, JP H2-133563 A (PTL 1) discloses "a high Al-containing stainless steel sheet production method comprising overlapping an Al sheet on at least one side of a stainless steel sheet containing C≤0.03%, Cr≤30%, and one or more of Ti, Nb, V, and Mo in an amount of 0.01% to 0.8% so as to achieve a proportion corresponding to the amount of Al to be contained, passing them between rolls to obtain a pressure bonded laminated sheet, and subjecting the obtained pressure bonded laminated sheet to a diffusion treatment at a temperature in a range of 600° C. to 1300° C. under the conditions that the Al layer is alloyed without melting".

JP 2004-169110 A (PTL 2) discloses "a Fe—Cr—Al-based stainless steel sheet containing, in mass %, Cr: 10% or more and 30% or less, Al: more than 6.5% and 15% or less, one or both of Ti: 0.02% or more and 0.1% or less and Nb: 0.02% or more and 0.3% or less, La: 0.01% or more and 0.1% or less, Ce: 0.01% or more and 0.1% or less, and P: 0.01% or more and 0.05% or less".

CITATION LIST

Patent Literature

PTL 1: JP H2-133563 A
PTL 2: JP 2004-169110 A

SUMMARY

Technical Problem

With the technique described in PTL 1, a pressure bonded laminated sheet is prepared by overlapping an Al sheet on at least one side of a stainless steel sheet as a base steel sheet, and the pressure bonded laminated sheet is subjected to a predetermined heat treatment (hereafter also referred to as "diffusion heat treatment"). Consequently, Al is diffused into the base steel sheet, thus increasing the Al content in the Al-containing stainless steel sheet as a finished product.

With the technique described in PTL 2, a multilayer sheet is prepared by coating the surface of a stainless steel sheet as a base steel sheet with Al or an Al alloy, and the multilayer sheet is subjected to a predetermined diffusion heat treatment. Consequently, Al is diffused into the base steel sheet, thus increasing the Al content in the Al-containing stainless steel sheet as a finished product.

Hereafter, a steel sheet comprising: a base steel sheet composed of a stainless steel sheet; and an Al coating layer (including an Al sheet as described in PTL 1 and Al or an Al alloy as described in PTL 2) on the surface of the base steel sheet is collectively referred to as an "Al coating layer-equipped stainless steel sheet".

Al is an element having high solid solution strengthening capacity. That is, Al is an element that, as a result of dissolving in steel, significantly enhances the strength of the steel. Hence, Al-containing stainless steel sheets usually have low workability.

For example, if each of the Al-containing stainless steel sheets disclosed in PTL 1 and PTL 2 is subjected to corrugation which is a working method typically performed when using Al-containing stainless steel sheets as resistance heating elements, there is a possibility that the Al-containing stainless steel sheet cannot be worked into the desired shape or cracking occurs due to bending load.

This problem might be avoided by, for example, corrugating the Al coating layer-equipped stainless steel sheet into the desired shape before a diffusion heat treatment and then subjecting the resultant Al coating layer-equipped stainless steel sheet to the diffusion heat treatment to diffuse Al.

However, in the case of corrugating the Al coating layer-equipped stainless steel sheet, the Al coating layer on the surface exfoliates due to friction with a working tool such as a die.

In detail, since the strength of the Al coating layer itself is insufficient and also the adhesion between the Al coating layer and the base steel sheet is insufficient in the Al coating layer-equipped stainless steel sheet, if the Al coating layer-equipped stainless steel sheet is subjected to corrugation, the Al coating layer exfoliates.

The exfoliation of the Al coating layer leads to, for example, a decrease in the amount of Al that diffuses into the base steel sheet in the diffusion heat treatment, and an increase in the maintenance costs for removing Al adhering to the die.

It could therefore be helpful to provide an Al coating layer-equipped stainless steel sheet that is suitable as a material for producing resistance heating elements and the like and has significantly enhanced adhesion of an Al coating layer while ensuring sufficient workability.

Solution to Problem

Upon careful examination, we discovered that, by subjecting an Al coating layer-equipped stainless steel sheet to a heat treatment (hereafter also referred to as "pre-heat treatment") under specific conditions as pretreatment for a diffusion heat treatment, the adhesion between the Al coating layer and the base steel sheet can be improved without a decrease in workability.

We consider the reason for this as follows:

To completely diffuse Al contained in the Al coating layer into the base steel sheet, it is normally necessary to perform a heat treatment in a temperature range of more than 1000° C. for 30 minutes or more. If such a heat treatment is performed to completely diffuse Al contained in the Al coating layer into the base steel sheet, however, the strength of the base steel sheet increases and the workability of the base steel sheet decreases.

If, on the other hand, a pre-heat treatment is performed at a lower temperature for a shorter period of time than in the diffusion heat treatment, Fe and Cr diffuse from the base steel sheet into the Al coating layer, and an appropriate amount of Fe and Cr dissolves in the Al coating layer. This increases the strength of the Al coating layer itself, and makes the Al coating layer resistant to exfoliation even under load such as friction or bending. Simultaneously, interdiffusion occurs around the interface between the Al coating layer and the base steel sheet, thus strengthening the interface between the Al coating layer and the base steel sheet. As a result, the adhesion between the Al coating layer and the base steel sheet is improved. Since these phenomena by the pre-heat treatment take place in the Al coating layer and in the vicinity of the interface between the base steel sheet and the Al coating layer, the diffusion of Al from the Al coating layer into the base steel sheet does not progress much.

We thus consider that, by subjecting the Al coating layer-equipped stainless steel sheet to the pre-heat treatment, the adhesion between the Al coating layer and the base steel sheet can be improved without a decrease in workability.

Based on these discoveries, we studied the diffusion state of Fe and Cr in the Al coating layer after the pre-heat treatment, and discovered the following:

(A) The total content of Fe and Cr at a first depth of the Al coating layer illustrated in FIG. 1, specifically, a depth: (depth a+depth b)/2 from the surface of the Al coating layer, is an effective index for estimating not only the state of diffusion of Fe and Cr from the base steel sheet into the Al coating layer but also the state of diffusion of Al from the Al coating layer into the base steel sheet.

The depth a and the depth b are defined as follows:

Depth a: a depth at which the Al strength is [maximum Al strength]/2 in a depth region from the surface of the Al coating layer to a point A of an Al concentration profile in the depth (thickness) direction, where the point A is a depth at which the Al strength is the maximum Al strength in the Al concentration profile.

Depth b: a depth at which the Al strength is ([maximum Al strength]+[Al strength corresponding to the Al content in the base steel sheet (hereafter also referred to as "Al strength of the base steel sheet")])/2 in a depth region from the point A to the interface between the base steel sheet and the Al coating layer of the Al concentration profile.

(B) In particular, by controlling the total content of Fe and Cr at the first depth of the Al coating layer to a range of 20 mass % to 70 mass %, the adhesion between the Al coating layer and the base steel sheet can be significantly improved while ensuring sufficient workability.

The present disclosure is based on these discoveries and further studies.

We thus provide:

1. An Al coating layer-equipped stainless steel sheet comprising: a base steel sheet; and an Al coating layer on a surface of the base steel sheet, wherein the base steel sheet is a stainless steel sheet having a thickness of 100 μm or less and a chemical composition containing (consisting of), in mass %, C: 0.030% or less, Si: 1.00% or less, Mn: 1.00% or less, P: 0.040% or less, S: 0.010% or less, Cr: 11.0% to 30.0%, Al: 0.01% to 6.50%, Ni: 0.01% to 0.50%, and N: 0.020% or less, with a balance consisting of Fe and inevitable impurities, a thickness of the Al coating layer is 0.5 μm to 10.0 μm, and a total content of Fe and Cr at a first depth of the Al coating layer is 20 mass % to 70 mass %, where the first depth of the Al coating layer is a depth of (depth a +depth b)/2 (i.e. ½ of a sum of a depth a and a depth b) from a surface of the Al coating layer, the depth a is a depth at which an Al strength is [maximum Al strength]/2 (i.e. ½ of a maximum Al strength), in a depth region from the surface of the Al coating layer to a point A of an Al concentration profile in a depth direction (that is, a direction of a thickness of the Al coating layer-equipped stainless steel sheet), the point A being a depth at which the Al strength is the maximum Al strength in the Al concentration profile, and the depth b is a depth at which the Al strength is ([maximum Al strength]+[Al strength corresponding to the Al content in the base steel sheet])/2 (i.e. ½ of a sum of the maximum Al strength and an Al strength corresponding to the Al content in the base steel sheet), in a depth region from the point A to an interface between the base steel sheet and the Al coating layer of the Al concentration profile.

2. The Al coating layer-equipped stainless steel sheet according to 1. , wherein the chemical composition of the base steel sheet further contains, in mass %, one or more selected from the group consisting of Cu: 0.10% or less, Ti: 0.50% or less, Nb: 0.50% or less, V: 0.50% or less, Zr: 0.20% or less, Hf: 0.20% or less, Mo: 6.00% or less, W: 6.00% or less, B: 0.0050% or less, REM: 0.20% or less, Ca: 0.0100% or less, and Mg: 0.0100% or less.

Advantageous Effect

It is thus possible to provide an Al coating layer-equipped stainless steel sheet that is suitable as a material for producing resistance heating elements and the like and has significantly enhanced adhesion of an Al coating layer while ensuring sufficient workability.

Such an Al coating layer-equipped stainless steel sheet can be used to more advantageously produce parts of various shapes having high Al content, such as a heating element of an exhaust gas heater installed immediately upstream of an exhaust gas purifier in a vehicle and the like, a heating element of an electric furnace or an electric cooker, a catalyst support, etc.

BRIEF DESCRIPTION OF THE DRAWINGS

In the accompanying drawings:

FIG. 2 is a schematic diagram illustrating a measurement position for line analysis of an Al concentration profile;

DETAILED DESCRIPTION

Figure 1:
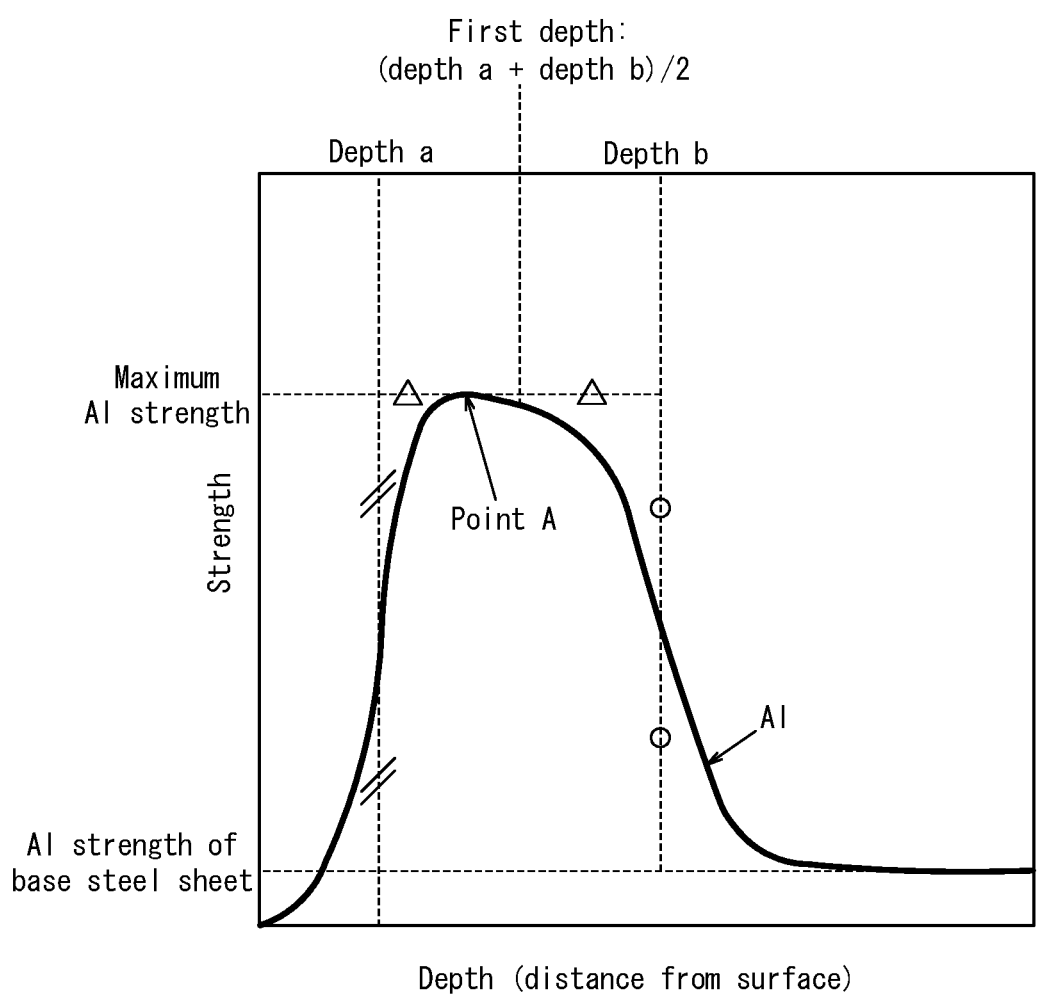
FIG. 1 is a schematic diagram explaining the definition of a first depth of an Al coating layer.

One of the disclosed embodiments will be described below.

First, the chemical composition of a base steel sheet of an Al coating layer-equipped stainless steel sheet (hereafter also simply referred to as "base steel sheet") according to one of the disclosed embodiments will be described below. While the unit of the content of each element in the chemical composition is "mass %", the content is expressed simply in "%" unless otherwise specified.

C: 0.030% or Less

If the C content is more than 0.030%, the toughness of the steel decreases, making it difficult to produce the base steel sheet. The C content is therefore 0.030% or less. The C content is preferably 0.020% or less, and more preferably 0.010% or less. No lower limit is placed on the C content, but the C content is preferably 0.001% or more.

Si: 1.00% or Less

Si has an effect of increasing the electrical resistivity. The electrical resistivity improving effect of Si per mass % is approximately equal to that of Al. From the viewpoint of achieving this effect, the Si content is preferably 0.01% or more. The Si content is more preferably 0.10% or more. If the Si content is more than 1.00% %, the steel hardens excessively, making it difficult to produce the base steel sheet. The Si content is therefore 1.00% or less. The Si content is preferably 0.50% or less, and more preferably 0.20% or less.

Mn: 1.00% or Less

If the Mn content is more than 1.00%, the oxidation resistance of the steel decreases. The Mn content is therefore 1.00% or less. The Mn content is preferably 0.50% or less, and more preferably 0.15% or less. If the Mn content is less than 0.01%, refining is difficult. Accordingly, the Mn content is preferably 0.01% or more.

P: 0.040% or Less

If the P content is more than 0.040%, the toughness and ductility of the steel decrease, making the production of the base steel sheet difficult. The P content is therefore 0.040% or less. The P content is preferably 0.030% or less. No lower limit is placed on the P content. However, since excessive dephosphorization leads to increased costs, the P content is preferably 0.005% or more.

S: 0.010% or Less

If the S content is more than 0.010%, the hot workability decreases, making the production of the base steel sheet difficult. The S content is therefore 0.010% or less. The S content is preferably 0.004% or less, and more preferably 0.002% or less. No lower limit is placed on the S content. However, since excessive desulfurization leads to increased costs, the S content is preferably 0.0005% or more.

Cr: 11.0% to 30.0%

Cr is an element necessary to ensure the oxidation resistance at high temperature. If the Cr content is less than 11.0%, the oxidation resistance at high temperature cannot be ensured sufficiently. If the Cr content is more than 30.0%, the toughness of the slab or the hot-rolled steel sheet in the production process decreases, making the production of the base steel sheet difficult. The Cr content is therefore 11.0% to 30.0%. The Cr content is preferably 15.0% or more, and more preferably 18.0% or more. The Cr content is preferably 26.0% or less, and more preferably 22.0% or less.

Al: 0.01% to 6.50%

Al has an effect of increasing the electrical resistivity. Al also has an effect of improving the oxidation resistance by forming an oxide layer mainly composed of $Al_2O_3$ at high temperature when the Al coating layer-equipped stainless steel sheet is used as a resistance heating element. However, given that the Al content is increased by diffusing Al in the Al coating layer into the base steel sheet by a diffusion heat treatment in a finished product such as a resistance heating element, the Al content in the chemical composition of the base steel sheet need not be so high. The Al content is therefore 0.01% or more. As the amount of Al diffused into the base steel sheet by the diffusion heat treatment increases, the possibility of deformation increases. Accordingly, it is preferable to increase the Al content in the base steel sheet and reduce the amount of Al diffused from the Al coating layer. The Al content is therefore preferably 4.00% or more, and more preferably 5.00% or more. If the Al content is more than 6.50%, the toughness of the steel decreases, making the production of the base steel sheet difficult. The Al content is therefore 6.50% or less.

Ni: 0.01% to 0.50%

Ni has an effect of improving the brazing property when producing a resistance heating element. From the viewpoint of achieving this effect, the Ni content is 0.01% or more. Meanwhile, Ni is an element that promotes the formation of austenite microstructure. Accordingly, if the Ni content is more than 0.50%, austenite microstructure tends to form when the Al coating layer-equipped stainless steel sheet is used as a resistance heating element. In detail, during use as a resistance heating element, if oxidation at high temperature progresses and Al in the steel is exhausted, austenite microstructure tends to form. In the case where austenite microstructure forms, the coefficient of thermal (heat) expansion of the part changes, which may result in problems such as a fracture of the part. The Ni content is therefore 0.50% or less. The Ni content is preferably 0.20% or less.

N: 0.020% or Less

If the N content is more than 0.020%, the toughness of the steel decreases, making the production of the base steel sheet difficult. The N content is therefore 0.020% or less. The N content is preferably 0.010% or less. No lower limit is placed on the N content. However, since excessive denitrification leads to increased costs, the N content is preferably 0.001% or more.

While the basic components of the base steel sheet have been described above, the chemical composition may optionally further contain, in addition to the basic components, Cu: 0.10% or ess,
Ti: 0.50% or less,
Nb: 0.50% or less,
V: 0.50% or less,
Zr: 0.20% or less,
Hf: 0.20% or less,
Mo: 6.00% or less,
W: 6.00% or less, B: 0.0050% or less,
REM: 0.20% or less,
Ca: 0.0100% or less, and
Mg: 0.0100% or less,
as appropriate.
Cu: 0.10% or Less Cu has an effect of precipitating into the steel and improving the high-temperature strength, and accordingly may be optionally contained in an amount of 0.01% or more. If the Cu content is more than 0.10%, the toughness of the steel decreases. Accordingly, in the case of containing Cu, the Cu content is 0.10% or less. The Cu content is more preferably 0.05% or less, and further preferably 0.03% or less.

Ti: 0.50% or Less

Ti has an effect of combining with C or N in the steel and improving the toughness and an effect of improving the oxidation resistance. Accordingly, Ti may be optionally contained in an amount of 0.01% or more. The Ti content is more preferably 0.05% or more. If the Ti content is more than 0.50%, a large amount of Ti oxide mixes into the $Al_2O_3$ layer which forms at high temperature when the Al coating layer-equipped stainless steel sheet is used as a resistance heating element, as a result of which the oxidation resistance at high temperature decreases. Accordingly, in the case of containing Ti, the Ti content is 0.50% or less. The Ti content is more preferably 0.20% or less.

Nb: 0.50% or Less

Nb has an effect of combining with C or N in the steel and improving the toughness. Accordingly, Nb may be optionally contained in an amount of 0.01% or more. The Nb content is more preferably 0.05% or more. If the Nb content is more than 0.50%, a large amount of Nb oxide mixes into the $Al_2O_3$ layer which forms at high temperature when the Al coating layer-equipped stainless steel sheet is used as a resistance heating element, as a result of which the oxidation resistance at high temperature decreases. Accordingly, in the case of containing Nb, the Nb content is 0.50% or less. The Nb content is more preferably 0.20% or less.

V: 0.50% or Less

V has an effect of combining with C or N in the steel and improving the toughness. Accordingly, V may be optionally contained in an amount of 0.01% or more. The V content is more preferably 0.05% or more. If the V content is more than 0.50%, a large amount of V oxide mixes into the $Al_2O_3$ layer which forms at high temperature when the Al coating layer-equipped stainless steel sheet is used as a resistance heating element, as a result of which the oxidation resistance at high temperature decreases. Accordingly, in the case of containing V, the V content is 0.50% or less. The V content is more preferably 0.20% or less, and further preferably 0.10% or less.

Zr: 0.20% or Less

Zr improves the adhesion of $Al_2O_3$ that forms at high temperature when the Al coating layer-equipped stainless steel sheet is used as a resistance heating element. In particular, Zr has an effect of improving the exfoliation resistance of the $Al_2O_3$ layer and thus improving the oxidation resistance in an environment in which oxidation repeatedly occurs. Zr also has an effect of extending the life when the Al coating layer-equipped stainless steel sheet is used as a resistance heating element, by decreasing the growth rate of $Al_2O_3$.

From the viewpoint of achieving these effects, the Zr content is preferably 0.01% or more. The Zr content is more preferably 0.02% or more. If the Zr content is more than 0.20%, Zr forms an intermetallic compound with Fe or the like and causes a decrease in toughness. Accordingly, in the case of containing Zr, the Zr content is 0.20% or less. The Zr content is more preferably 0.15% or less, and further preferably 0.05% or less.

Hf: 0.20% or Less

Hf improves the adhesion of $Al_2O_3$ that forms at high temperature when the Al coating layer-equipped stainless steel sheet is used as a resistance heating element. In particular, Hf has an effect of improving the exfoliation resistance of the $Al_2O_3$ layer and thus improving the oxidation resistance in an environment in which oxidation repeatedly occurs. Hf also has an effect of extending the life when the Al coating layer-equipped stainless steel sheet is used as a resistance heating element, by decreasing the growth rate of $Al_2O_3$. From the viewpoint of achieving these effects, the Hf content is preferably 0.01% or more. The Hf content is more preferably 0.02% or more. If the Hf content is more than 0.20%, Hf forms an intermetallic compound with Fe or the like and causes a decrease in toughness. Accordingly, in the case of containing Hf, the Hf content is 0.20% or less. The Hf content is more preferably 0.15% or less.

Mo: 6.00% or Less

Mo has an effect of, by increasing the strength at high temperature, suppressing deformation such as warpage or distortion in the base steel sheet in the diffusion heat treatment. Mo also contributes to longer life of the resistance heating element by increasing the strength at high temperature. These effects are achieved if the Mo content is 0.01% or more. The Mo content is more preferably 1.00% or more. If the Mo content is more than 6.00%, the workability decreases. Accordingly, in the case of containing Mo, the Mo content is 6.00% or less. The Mo content is more preferably 4.00% or less.

W: 6.00% or Less

W has an effect of, by increasing the strength at high temperature, suppressing deformation such as warpage or distortion in the base steel sheet in the diffusion heat treatment. W also contributes to longer life of the resistance heating element by increasing the strength at high temperature. These effects are achieved if the W content is 0.01% or more. The W content is more preferably 1.00% or more. If the W content is more than 6.00%, the workability decreases. Accordingly, in the case of containing W, the W content is 6.00% or less. The W content is more preferably 5.00% or less, and further preferably 3.50% or less.

In the case of containing both Mo and W, the total content of Mo and W is preferably 6.00% or less, from the viewpoint of preventing a decrease in workability.

B: 0.0050% or Less

B has an effect of strengthening the grain boundaries of the steel and preventing cracking in hot rolling in the production process of the base steel sheet. This effect is achieved if the B content is 0.0002% or more. The B content is more preferably 0.0010% or more. If the B content is more than 0.0050%, the oxidation resistance decreases. Accordingly, in the case of containing B, the B content is 0.0050% or less. The B content is more preferably 0.0040% or less.

REM: 0.20% or Less

REM refers to Sc, Y, and lanthanoid-based elements (elements of atomic numbers 57 to 71 such as La, Ce, Pr, Nd, and Sm). REM has an effect of improving the adhesion of an $Al_2O_3$ layer that forms at high temperature when the Al coating layer-equipped stainless steel sheet is used as a resistance heating element. In particular, REM has an effect of improving the exfoliation resistance of the $Al_2O_3$ layer in an environment in which oxidation repeatedly occurs. This effect is achieved if the REM content (the total content of Sc, Y, and lanthanoid-based elements) is 0.01% or more. The REM content is more preferably 0.03% or more. If the REM content is more than 0.20%, the hot workability decreases, making the production of the base steel sheet difficult. Accordingly, in the case of containing REM, the REM content is 0.20% or less. The REM content is more preferably 0.10% or less.

As REM, one element from among Sc, Y, and lanthanoid-based elements may be contained, or two or more elements from among Sc, Y, and lanthanoid-based elements may be contained together.

Ca: 0.0100% or Less

An appropriate amount of Ca has an effect of improving the oxidation resistance by improving the property of adhesion of the $Al_2O_3$ layer to the steel and decreasing the growth rate of the $Al_2O_3$ layer. The $Al_2O_3$ layer mentioned here is formed when the Al coating layer-equipped stainless steel sheet is used as a resistance heating element. This effect is achieved if the Ca content is 0.0002% or more. The Ca content is more preferably 0.0005% or more. The Ca content is further preferably 0.0010% or more. If Ca is contained excessively, the toughness and the oxidation resistance decrease. Accordingly, in the case of containing Ca, the Ca content is 0.0100% or less. The Ca content is more preferably 0.0050% or less.

Mg: 0.0100% or Less

An appropriate amount of Mg has an effect of improving the oxidation resistance by improving the property of adhesion of the $Al_2O_3$ layer, which is formed when the Al coating layer-equipped stainless steel sheet is used as a resistance heating element, to the steel and decreasing the growth rate of the $Al_2O_3$ layer. This effect is achieved if the Mg content is 0.0002% or more. The Mg content is more preferably 0.0010% or more. If Mg is contained excessively, the toughness and the oxidation resistance decrease. Accordingly, in the case of containing Mg, the Mg content is 0.0100% or less. The Mg content is more preferably 0.0050% or less, and further preferably 0.0015% or less.

The components other than those described above are Fe and inevitable impurities.

The thickness of the base steel sheet is 100 µm or less. In the case of using the Al coating layer-equipped stainless steel sheet as a material for producing a resistance heating element of, for example, an exhaust gas heater installed immediately upstream of an exhaust gas purifier, the Al coating layer-equipped stainless steel sheet is preferably thin in order to reduce the back pressure and increase the contact area between the resistance heating element and the exhaust gas. In the case of using the Al coating layer-equipped stainless steel sheet in a heating element of, for example, an electrical cooker, the heating efficiency increases when the cross-sectional area is reduced and the surface area is increased, i.e. when the Al coating layer-equipped stainless steel sheet is thinner. The thickness of the base steel sheet is preferably 80 µm or less.

No lower limit is placed on the thickness of the base steel sheet, but the thickness is preferably 20 µm or more in order to ensure the strength.

Next, an Al coating layer formed on the surface of the base steel sheet of the Al coating layer-equipped stainless steel sheet will be described below. The Al coating layer of the Al coating layer-equipped stainless steel sheet may be provided on only one side or both sides of the base steel sheet.

Thickness of Al coating layer: 0.5 µm to 10.0 µm

If the thickness of the Al coating layer is less than 0.5 µm, the amount of Al diffused into the base steel sheet is insufficient. Consequently, the desired Al content cannot be obtained in the resistance heating element or the like as a finished product. If the thickness of the Al coating layer is more than 10.0 µm, the amount of Al diffused into the base steel sheet is excessively large. This may cause the base steel sheet to deform in the diffusion heat treatment.

The thickness of the Al coating layer is therefore 0.5 µm to 10.0 µm. The thickness of the Al coating layer is preferably 1.0 µm or more. The thickness of the Al coating layer is preferably 5.0 µm or less.

The thickness of the Al coating layer herein is the thickness per one side. In the case where the Al coating layer is formed on both sides of the base steel sheet, the thickness of the Al coating layer on each of the sides (hereafter also referred to as "first side" and "second side") is in the foregoing range.

The thickness of the Al coating layer is measured by the following method:

A test piece of 10 mm in width and 15 mm in length is cut from the Al coating layer-equipped stainless steel sheet. The test piece is buried in resin so as to expose a cross-section in the length direction (rolling direction), and the cross-section is mirror polished. The cross-section is then observed using a scanning electron microscope (SEM) with 5000 magnification, and the thickness of the Al coating layer (the distance from the interface between the Al coating layer and the base steel sheet to the surface of the Al coating layer) on each side (first side and second side) is measured in five locations at intervals of 1 mm in the length direction (rolling direction) from the longitudinal (rolling direction) center position of the test piece. The average value of these measurement values is taken to be the thickness of the Al coating layer in the Al coating layer-equipped stainless steel sheet. The thickness of the Al coating layer on each side (first side and second side) is the average value of the measurement values on the side.

Total content of Fe and Cr at first depth of Al coating layer: 20 mass % to 70 mass %

As mentioned above, the total content of Fe and Cr at the first depth of the Al coating layer is an effective index of the state of diffusion of Fe and Cr from the base steel sheet into the Al coating layer by the pre-heat treatment. The total content of Fe and Cr at the first depth of the Al coating layer is also an effective index for estimating the state of diffusion of Al from the Al coating layer into the base steel sheet.

In detail, if the total content of Fe and Cr at the first depth of the Al coating layer is less than 20 mass %, the diffusion of Fe and Cr from the base steel sheet into the Al coating layer is insufficient, and the desired adhesion between the Al coating layer and the base steel sheet cannot be achieved. If the total content of Fe and Cr at the first depth of the Al coating layer is more than 70 mass %, the diffusion of Al from the Al coating layer into the base steel sheet progresses excessively, and the workability of the base steel sheet decreases. The total content of Fe and Cr at the first depth of the Al coating layer is therefore 20 mass % to 70 mass %. The total content of Fe and Cr at the first depth of the Al coating layer is preferably 30 mass % or more, and more preferably 40 mass % or more.

Here, the first depth of the Al coating layer is a depth: (depth a+depth b)/2 from the surface of the Al coating layer, as illustrated in FIG. 1.

The depth a and the depth b are defined as follows:

Depth a: a depth (i.e. distance from the surface of the Al coating layer) at which the Al strength is [maximum Al strength]/2 in a depth region from the surface of the Al coating layer to a point A of an Al concentration profile in the depth (thickness) direction, where the point A is a depth at which the Al strength is the maximum Al strength in the Al concentration profile.

Depth b: a depth (i.e. distance from the surface of the Al coating layer) at which the Al strength is ([maximum Al strength]+[Al strength corresponding to the Al content in the base steel sheet (hereafter also referred to as "Al strength of the base steel sheet")])/2 in a depth region from the point A to the interface between the base steel sheet and the Al coating layer of the Al concentration profile.

In the case where the Al coating layer is formed on both sides of the base steel sheet, for each of the respective Al coating layers on the first side and the second side, the first depth, the depth a, the depth b, and the point A are determined, and the total content of Fe and Cr at the first depth of the Al coating layer is calculated. In this case, the total content of Fe and Cr at the first depth of the Al coating layer on each of the first side and the second side needs to satisfy the foregoing range (20 mass % to 70 mass %).

The Al concentration profile from the surface of the Al coating layer in the depth (thickness) direction is obtained in the following manner:

A test piece of 10 mm in width and 15 mm in length is cut from the Al coating layer-equipped stainless steel sheet. The test piece is buried in resin so as to expose a cross-section in the length direction (rolling direction), and the cross-section is mirror polished.

Following this, at the center position of the cross-section in the length direction (rolling direction), line analysis is performed on the cross-section of the Al coating layer from the surface of the Al coating layer in the depth (thickness) direction using an electron probe microanalyzer (EPMA) or an energy-dispersive X-ray spectrometer (EDX) as illustrated in FIG. 2, to obtain the Al concentration profile.

The total content of Fe and Cr at the first depth of the Al coating layer is calculated in the following manner:

Using the foregoing test piece, the Fe and Cr concentration profile from the surface of the Al coating layer in the depth (thickness) direction is obtained in the same way as the Al concentration profile. Since the Al coating layer is basically made up of Al, Fe, and Cr, the strength of the Al, Fe, and Cr concentration profile at the first depth of the Al coating layer determined from the Al concentration profile is used to calculate the total content of Fe and Cr at the position. This measurement is performed in five locations (five locations at intervals of 1 mm in the length direction (rolling direction) from the longitudinal (rolling direction) center position of the longitudinal (rolling direction) cross-section), and the average value of the measurement values is taken to be the total content of Fe and Cr at the first depth of the Al coating layer. In the case where the Al coating layer is located on both sides of the base steel sheet, the foregoing measurement is performed on each of the sides (i.e. in five locations per one side), and the average value of the total content of Fe and Cr is calculated for each side. The resultant value is taken to be the total content of Fe and Cr at the first depth of the Al coating layer on each side.

Figure 3A:
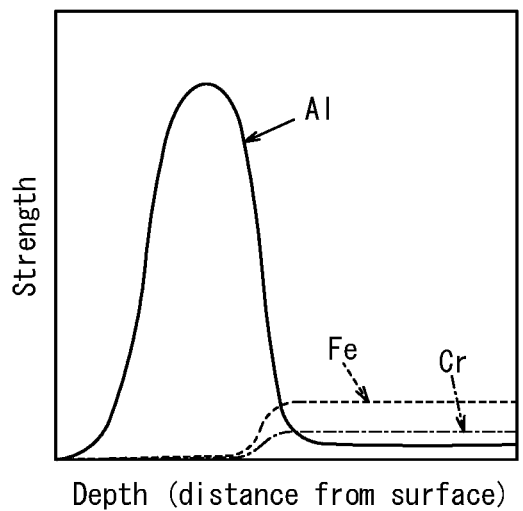
FIG. 3A is a schematic diagram illustrating an example of a concentration profile of an Al coating layer-equipped stainless steel sheet.
Figure 3B:
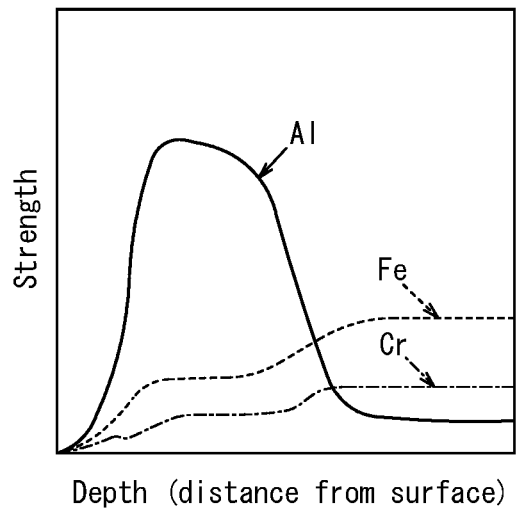
FIG. 3B is a schematic diagram illustrating an example of a concentration profile of an Al coating layer-equipped stainless steel sheet.

FIGS. 3A to 3B each illustrate an example of the concentration profile of an Al coating layer-equipped stainless steel sheet measured by the method described above. In FIGS. 3A to 3B, the vertical axis is an arbitrary unit, and the scale is not standardized.

FIG. 3A illustrates an example of the concentration profile of an Al coating layer-equipped stainless steel sheet before a pre-heat treatment. As can be seen from this concentration profile, Fe and Cr are hardly diffused in the Al coating layer before the pre-heat treatment.

FIG. 3B illustrates an example of the concentration profile of an Al coating layer-equipped stainless steel sheet that has undergone a pre-heat treatment under appropriate conditions to control the total content of Fe and Cr at the first depth of the Al coating layer to a range of 20 mass % to 70 mass %. In this Al coating layer-equipped stainless steel sheet, the diffusion of Fe and Cr into the Al coating layer has progressed adequately, so that the strength of the Al coating layer itself increases. Moreover, interdiffusion has occurred around the interface between the Al coating layer and the base steel sheet, thus strengthening the interface between the Al coating layer and the base steel sheet. As a result, the adhesion between the Al coating layer and the base steel sheet is improved. Meanwhile, since the diffusion of Al from the Al coating layer into the base steel sheet has not progressed much, the workability is ensured.

Figure 3C:
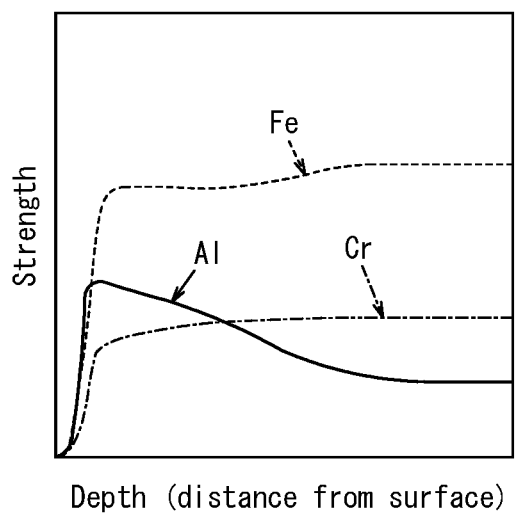
FIG. 3C is a schematic diagram illustrating an example of a concentration profile of an Al coating layer-equipped stainless steel sheet.

FIG. 3C illustrates an example of the concentration profile of an Al coating layer-equipped stainless steel sheet in which the total content of Fe and Cr at the first depth of the Al coating layer exceeds 70 mass % as a result of a pre-heat treatment. In this Al coating layer-equipped stainless steel sheet, the diffusion of Fe and Cr into the Al coating layer has progressed excessively, and also the diffusion of Al from the Al coating layer into the base steel sheet has progressed excessively. Consequently, the workability decreases.

The Al coating layer is basically made up of Al, Fe, and Cr. The Al coating layer may contain 15 mass % or less Si, besides Al, Fe, and Cr. Even in the case where the Al coating layer contains Si, the total content of Fe and Cr at the first depth of the Al coating layer is calculated from the Al, Fe, and Cr concentration profile as described above. The same applies to the case where the Al coating layer contains inevitable impurities as described below.

The Al coating layer may further contain inevitable impurities. Examples of the inevitable impurities include B, Be, Mg, Ca, Sr, Ti, Mn, Co, Ni, Cu, Zn, Sn, Pb, As, Sb, Bi, La, and Ce. The total content of the inevitable impurities is typically 1 mass % or less.

A preferred method of producing the Al coating layer-equipped stainless steel sheet according to one of the disclosed embodiments will be described below.

First, a base steel sheet having the foregoing chemical composition is prepared.

For example, molten steel having the foregoing chemical composition is prepared by steelmaking through a commonly known method such as using a converter, an electric furnace, or a vacuum melting furnace, and is subjected to continuous casting or ingot casting and blooming to obtain a slab.

The slab is then rolled to obtain a stainless steel sheet as a base steel sheet.

The rolling method is not limited, and a conventional method may be used. Examples include a method of subjecting the slab to hot rolling to obtain a hot-rolled steel sheet and subjecting the hot-rolled steel sheet to cold rolling and cold-rolled sheet annealing, and a method of subjecting the slab to hot rolling to obtain a hot-rolled steel sheet and subjecting the hot-rolled steel sheet to hot-rolled sheet annealing and then to cold rolling. Hot-rolled sheet annealing and cold-rolled sheet annealing are optional processes, and only one or both of the processes may be performed or none of the processes may be performed. The conditions of hot rolling, hot-rolled sheet annealing, cold rolling, and cold-rolled sheet annealing are not limited, and may be in accordance with conventional methods.

For example, the slab is heated at 1100° C. to 1250° C. for 1 hour to 24 hours, and then subjected to hot rolling to obtain a hot-rolled steel sheet with a thickness of approximately 2.0 mm to 6.0 mm. After this, the hot-rolled steel sheet is optionally subjected to descaling by pickling or mechanical polishing, and further subjected to cold rolling and cold-rolled sheet annealing to obtain a stainless steel sheet of a predetermined thickness as a base steel sheet.

Following this, the base steel sheet is subjected to Al coating, to obtain an Al coating layer-equipped stainless steel sheet as a material on which a pre-heat treatment is to be performed (hereafter also referred to as "material to be pre-heat treated" or "Al coating layer-equipped stainless steel sheet (material to be pre-heat treated)"). The Al coating method is not limited, and may be vapor deposition, hot dip coating, lamination rolling, or the like.

Examples of the vapor deposition include physical vapor deposition (PVD) such as vacuum vapor deposition and ion plating, and chemical vapor deposition (CVD) such as thermal CVD and organometallic vapor deposition. The treatment conditions are not limited, and may be in accordance with conventional methods.

In the case of using the vapor deposition, for example, the thickness of the Al coating layer may be controlled in the following manner:

Masking tape of 10 mm square is attached to part of the region of the base steel sheet subjected to Al vapor deposition. After the Al vapor deposition treatment, the masking tape is peeled off the base steel sheet. The height difference between the vapor deposited part (the region where the masking tape has not been attached) and the non-vapor deposited part (the region where the masking tape has been attached) is then measured using a contact-type surface roughness measurement device. The height difference is taken to be the thickness of the Al coating layer (Al vapor deposited layer). The same operation is performed a plurality of times while varying the treatment time in the Al vapor deposition, to determine the relationship between the treatment time and the thickness of the Al coating layer formed as a result of vapor deposition. From the determined relationship, the treatment time for obtaining the desired thickness of the Al coating layer is calculated. The thickness of the Al coating layer can thus be controlled.

In the case of using the hot dip coating, for example, a method of production using a typical continuous hot dip coating line may be used. The treatment conditions are not limited, but the temperature of the molten bath (hereafter also referred to as "bath temperature") is preferably in a range of (solidification start temperature +20° C.) to 750° C. Here, the preferred lower limit of the bath temperature is set to (solidification start temperature +20° C.) in order to prevent local solidification of the coating components caused by a local bath temperature decrease of the molten bath. If the bath temperature is more than 750° C., rapid cooling of the coating metal adhering to the surface of the base steel sheet is difficult, which is likely to cause poor appearance called sagging. The preferred upper limit of the bath temperature is therefore 750° C. The immersion time in the molten bath is preferably 0.5 seconds or more, from the viewpoint of forming a sufficient amount of coating layer on the surface of the base steel sheet. The other treatment conditions may be in accordance with conventional methods.

The solidification start temperature can be calculated using thermodynamic calculation software Thermo-Calc.

Examples of the molten bath include a hot-dip Al molten bath and a hot-dip Al—Si alloy molten bath. The chemical composition of the hot-dip Al molten bath contains Al and inevitable impurities. The chemical composition of the hot-dip Al—Si alloy molten bath contains Al, 15.0 mass % or less Si, and inevitable impurities.

Si contained in the hot-dip Al—Si alloy molten bath has an effect of suppressing the formation of Fe—Al-based intermetallic compound phase at the interface between the Al coating layer and the base steel sheet in the coating treatment and improving the exfoliation resistance and workability of the Al coating layer. If the Si content in the Al coating layer is more than 15.0 mass %, however, columnar Si precipitates into the Al coating layer, as a result of which the exfoliation resistance and the workability may decrease. The Si content in the hot-dip Al—Si alloy molten bath is therefore preferably 15.0 mass % or less. No lower limit is placed on the Si content in the hot-dip Al—Si alloy molten bath, but the lower limit is preferably 1.0 mass %.

Examples of the inevitable impurities in each of the hot-dip Al molten bath and the hot-dip Al—Si alloy molten bath include B, Be, Mg, Ca, Sr, Ti, Mn, Co, Ni, Cu, Zn, Sn, Pb, As, Sb, Bi, La, and Ce. The total content of the inevitable impurities is typically 1 mass % or less.

In the case of using the hot dip coating, the thickness of the Al coating layer may be adjusted, for example, by $N_2$ gas wiping. The conditions of pretreatments such as degreasing are not limited, and may be in accordance with conventional methods. The temperature (sheet temperature) of the base steel sheet when entering the molten bath is not limited. However, in the case of using a continuous hot dip coating line, the temperature of the base steel sheet is preferably within the range of ±20° C. from the temperature of the molten bath, from the viewpoint of ensuring the coating properties and preventing a change in bath temperature in operation.

From the viewpoint of productivity improvement, the base steel sheet having a thickness of more than 100 µm may be, after being subjected to Al coating, subjected to additional cold rolling to obtain an Al coating layer-equipped stainless steel sheet (material to be pre-heat treated) having a final thickness.

For example, after the base steel sheet having a thickness of about 300 µm is subjected to hot-dip Al coating to form, on both sides of the base steel sheet, a hot-dip Al coating layer having a thickness of about 40 µm per one side, the resultant steel sheet may be subjected to additional cold rolling (hereafter also referred to as "finish rolling") to obtain an Al coating layer-equipped stainless steel sheet (material to be pre-heat treated) having a thickness of about 50 µm.

In this case, the finish rolling conditions and the thicknesses of the base steel sheet and the Al coating layer before the finish rolling are adjusted so that, in the Al coating layer-equipped stainless steel sheet (material to be pre-heat treated) obtained as a result of the finish rolling, the thickness of the base steel sheet will be 100 µm or less and the thickness of the Al coating layer per one side will be in a range of 0.5 µm to 10.0 µm. For example, in the foregoing case, the thickness of the base steel sheet is 300 µm and the thickness of the Al coating layer per one side is 40 µm before the finish rolling, so that the thickness (whole thickness) of the steel sheet is 380 µm. When rolling this steel sheet to 50 µm by finish rolling, the reduction ratio is approximately 87%. Here, the Al coating layer is also rolled, and the thickness of the Al coating layer after the finish rolling is estimated to be approximately 5.2 µm as a result of decreasing by approximately 87%. Thus, the finish rolling conditions and the thicknesses of the base steel sheet and the Al coating layer before the finish rolling are adjusted so that, in the Al coating layer-equipped stainless steel sheet (material to be pre-heat treated) obtained as a result of the finish rolling, the thickness of the base steel sheet will be 100 μm or less and the thickness of the Al coating layer per one side will be in a range of 0.5 μm to 10.0 μm.

The material to be pre-heat treated obtained in this way is subjected to a pre-heat treatment to diffuse Fe and Cr from the base steel sheet into the Al coating layer in a certain amount, specifically, in such an amount that causes the total content of Fe and Cr at the first depth of the Al coating layer to be 20 mass % to 70 mass %. Hence, the adhesion between the Al coating layer and the base steel sheet can be improved without a decrease in workability.

The amount of Fe and Cr diffused from the base steel sheet into the Al coating layer needs to be controlled by adjusting the treatment conditions of the pre-heat treatment, in particular the treatment temperature and the treatment time.

Since the diffusion rate of Fe and Cr from the base steel sheet into the Al coating layer is influenced by the chemical composition of the base steel sheet in the material to be pre-heat treated, the formation method for the Al coating layer, the thickness of the Al coating layer, and the like, appropriate treatment conditions of the pre-heat treatment vary depending on these factors. It is therefore important to prepare a preliminary test material that is the same as the material to be pre-heat treated, perform a preliminary test using the preliminary test material while varying the treatment temperature and the treatment time, and determine appropriate pre-heat treatment conditions beforehand.

For example, the pre-heat treatment conditions are the conditions of holding the steel sheet in a temperature range of 700° C. to 1000° C. for 10 seconds to 60 seconds in a non-oxidizing atmosphere. Usually, when the treatment temperature is higher and the treatment time is longer, the amount of Fe and Cr diffused from the base steel sheet into the Al coating layer and the amount of Al diffused from the Al coating layer into the base steel sheet are greater.

The atmosphere in the pre-heat treatment is preferably a vacuum of $1 \times 10^{-1}$ Pa or less or a non-oxidizing atmosphere such as an inert atmosphere of Ar or the like, a $N_2$ atmosphere or a mixed atmosphere of $H_2$ and $N_2$, in order to reduce the consumption of Al in the Al coating layer by oxidation. In the pre-heat treatment, the Al coating layer-equipped stainless steel sheet (material to be pre-heat treated) cut to an appropriate size may be treated in a batch-type furnace. From the viewpoint of productivity, however, it is preferable to use a continuous heat treatment device capable of continuously treating a steel strip.

The Al coating layer-equipped stainless steel sheet according to one of the disclosed embodiments can be produced in the above-described manner.

The Al coating layer-equipped stainless steel sheet according to one of the disclosed embodiments produced in the above-described manner is preferably worked into the desired shape such as a resistance heating element and then subjected to a diffusion heat treatment to increase the Al content. The Al content is preferably increased to 6.5% or more, from the viewpoint of achieving high electrical resistivity and excellent oxidation resistance.

In the diffusion heat treatment, it is preferable to hold the Al coating layer-equipped stainless steel sheet in a temperature range of 900° C. to 1200° C. for 10 minutes or more, from the viewpoint of homogenizing Al diffused. No upper limit is placed on the holding time, but the holding time is preferably 120 minutes or less from the viewpoint of productivity and the like. For example, in the case where a high-temperature brazing treatment is performed in the production process of the member such as a resistance heating element or the use temperature of the member exceeds 900° C., such heating may be substituted for the diffusion heat treatment.

For example, in the case where the work conditions are not strict, the Al coating layer-equipped stainless steel sheet according to one of the disclosed embodiments may be subjected to the diffusion heat treatment to obtain an Al-containing stainless steel sheet (preferably, Al content: 6.5% or more), which is then worked into the desired shape.

EXAMPLES

Slabs having the chemical compositions shown in Table 1 (the balance consisting of Fe and inevitable impurities) were each prepared by steelmaking using a 50 kg small vacuum melting furnace. The slabs were each heated to 1200° C., and then subjected to hot rolling in a temperature range of 900° C. to 1200° C. to obtain a hot-rolled steel sheet with a thickness of 2.0 mm. For steel ID "N" in Table 1, cracking occurred in the hot rolling, and therefore the subsequent evaluation was not performed. The obtained hot-rolled steel sheet was then subjected to hot-rolled sheet annealing at 900° C. for 1 minute in air. After surface scale was removed by pickling, the hot-rolled steel sheet was subjected to cold rolling to obtain a cold-rolled steel sheet with a thickness of 0.3 mm.

The cold-rolled steel sheet was subjected to cold-rolled sheet annealing of holding at 900° C. for 20 seconds in a mixed atmosphere of $H_2$ and $N_2$ ($H_2$:$N_2$=75:25 in volume ratio), and then further subjected to cold rolling to obtain a base steel sheet with the thickness shown in Table 2.

Subsequently, a test piece of 300 mm in length and 100 mm in width was cut from the obtained base steel sheet, and an Al coating layer (Al vapor deposited layer) was formed on both sides of the test piece by a vacuum vapor deposition method, thus obtaining a material to be pre-heat treated. The thickness of the Al coating layer was the same on the first side and the second side.

Each of the materials to be pre-heat treated thus obtained was subjected to a pre-heat treatment under the conditions shown in Table 2, to obtain the Al coating layer-equipped stainless steel sheet shown in Table 2. The atmosphere in the pre-heat treatment was a mixed atmosphere of $H_2$ and $N_2$ ($H_2$:$N_2$=75:25 in volume ratio). For comparison, some of the materials to be pre-heat treated were not pre-heat treated.

The chemical composition of the base steel sheet of each obtained Al coating layer-equipped stainless steel sheet was measured by collecting chips from part of the base steel sheet, from which the Al coating layer had been removed by polishing, and performing wet analysis. In each sample, the measured chemical composition was roughly the same as the chemical composition in Table 1, and was in the range of the above-described chemical composition of the base steel sheet in the Al coating layer-equipped stainless steel sheet according to one of the disclosed embodiments.

Next, the total content of Fe and Cr at the first depth of the Al coating layer was measured for both sides of the obtained Al coating layer-equipped stainless steel sheet, by the foregoing method. The measurement results are shown in Table 2. In the measurement, a scanning electron microscope (TM3000 produced by Hitachi High-Tech Corporation) and an accompanying EDX (SwiftED3000 produced by Oxford Instruments, accelerating voltage: 15 kV) were used.

Each obtained Al coating layer-equipped stainless steel sheet was used to evaluate (1) adhesion and (2) workability in the following manner. The evaluation results are shown in Table 4.

(1) Adhesion

Figure 4:
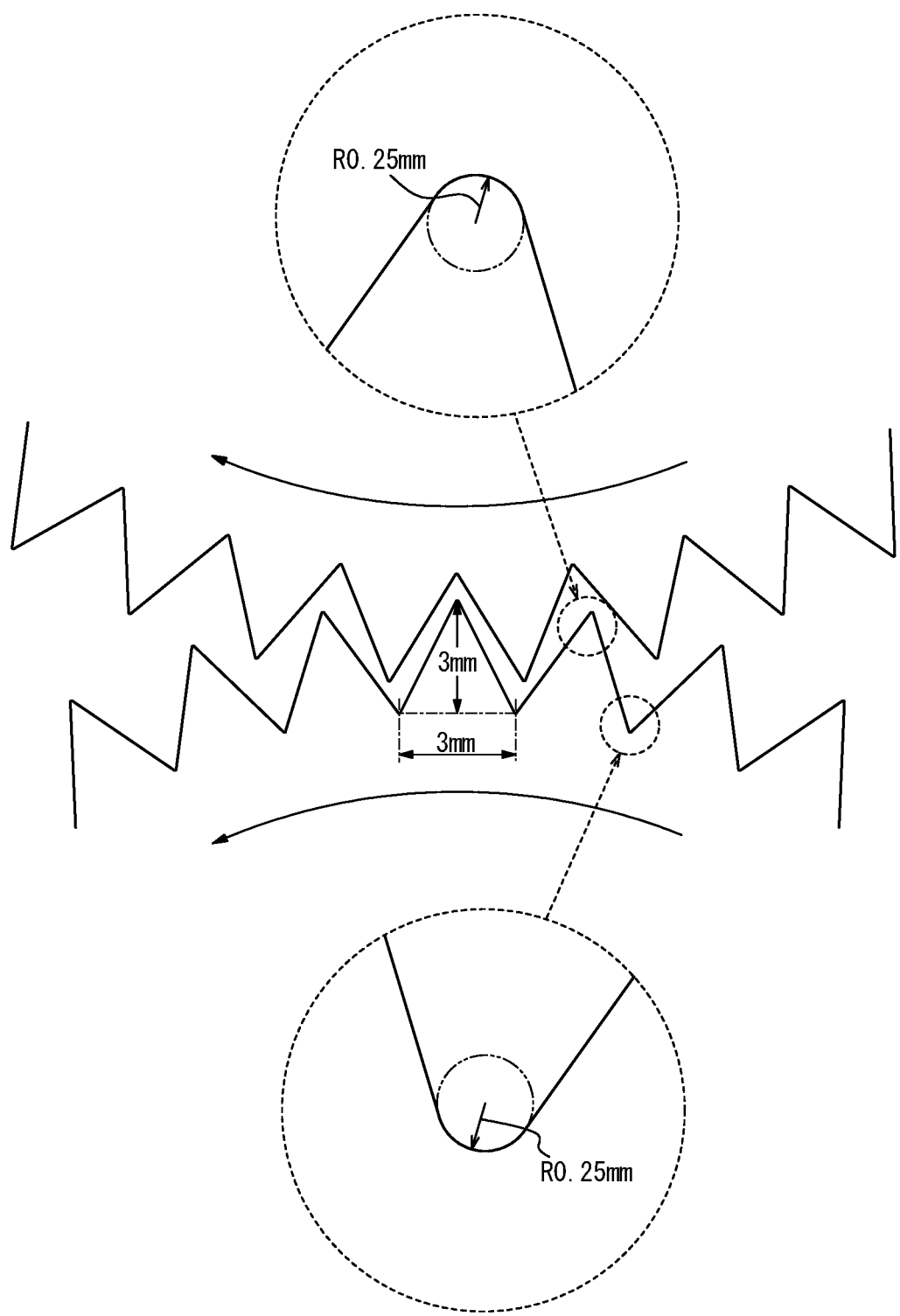
FIG. 4 is a schematic diagram illustrating a corrugation procedure.

As illustrated in FIG. 4, the Al coating layer-equipped stainless steel sheet (length: 80 mm, width: 50 mm) was corrugated (minimum bending radius: 0.25 mm, wave pitch: 3.0 mm, wave height: 3.0 mm) by passing the steel sheet between two gear-type rolls.

The corrugated Al coating layer-equipped stainless steel sheet and the surface of each of the gear-type rolls were then visually examined.

The adhesion was evaluated as ○ (good) in the case where the Al coating layer neither exfoliated nor adhered to the gear-type roll, and evaluated as x (poor) in the case where the Al coating layer exfoliated or adhered to the gear-type roll.

(2) Workability

The foregoing corrugated Al coating layer-equipped stainless steel sheet was visually examined to determine whether a fracture or cracking occurred.

The workability was evaluated as ○ (good) in the case where there was no fracture or cracking of 1 mm or more in length, and evaluated as x (poor) in the case where there was a fracture or cracking of 1 mm or more in length.

Next, each Al coating layer-equipped stainless steel sheet not subjected to corrugation was subjected to a diffusion heat treatment of holding at 1150° C. for 30 minutes in a vacuum, to diffuse Al in the Al coating layer into the base steel sheet and thus obtain an Al-containing stainless steel sheet. For Nos. 2 and 4 to 7, the subsequent evaluation was not performed because the evaluation result of (1) adhesion or (2) workability was x (poor).

The chemical composition of each obtained Al-containing stainless steel sheet was measured by collecting chips from part of the Al-containing stainless steel sheet and performing wet analysis. The measurement results are shown in Table 3. The balance consists of Fe and inevitable impurities.

Each obtained Al-containing stainless steel sheet was used to evaluate (3) oxidation resistance and (4) electrical resistivity in the following manner. The evaluation results are shown in Table 4.

(3) Oxidation Resistance

Two test pieces with a width of 20 mm and a length of 30 mm were collected from the obtained Al-containing stainless steel sheet, and subjected to a treatment of oxidizing in an air atmosphere at 1100° C. for 400 hours. The mass gain by oxidation between before and after the treatment (i.e. the value obtained by dividing the amount of mass change of the test piece between before and after the oxidation treatment by the surface area of the test piece before the oxidation treatment) was measured. The average value of the mass gains by oxidation of the test pieces was taken to be the mass gain by oxidation of the Al-containing stainless steel sheet, which was evaluated based on the following criteria:

⊚ (excellent): mass gain by oxidation of 8.0 $g/m^2$ or less
○ (good): mass gain by oxidation of more than 8.0 $g/m^2$ and 12.0 $g/m^2$ or less
x (poor): mass gain by oxidation of more than 12.0 $g/m^2$, or occurrence of layer exfoliation (4) Electrical Resistivity The electrical resistivity was measured by the four-terminal method defined in JIS C 2525.

Five test pieces of 10 mm×80 mm were cut from the obtained Al-containing stainless steel sheet, and the volume resistivity of each test piece was measured. Their average value was taken to be the volume resistivity of the Al-containing stainless steel sheet, which was evaluated based on the following criteria:

⊚ (excellent): volume resistivity of more than 140 μΩ·cm
○ (good): volume resistivity of more than 100 μΩ·cm and 140 μΩ·cm or less
x (poor): volume resistivity of 100 μΩ·cm or less.

TABLE 1

| Steel ID | Chemical composition (mass %) | | | | | | | | | | Remarks |
|---|---|---|---|---|---|---|---|---|---|---|---|
| | C | Si | Mn | P | S | Cr | Al | Ni | N | Others | |
| A | 0.006 | 0.15 | 0.12 | 0.023 | 0.002 | 20.4 | 5.62 | 0.13 | 0.006 | — | Conforming steel |
| B | 0.005 | 0.15 | 0.11 | 0.023 | 0.001 | 20.3 | 5.88 | 0.15 | 0.006 | Zr: 0.03, La: 0.079 | Conforming steel |
| C | 0.006 | 0.14 | 0.10 | 0.024 | 0.002 | 20.3 | 5.83 | 0.14 | 0.006 | Mo: 3.11, Zr: 0.04, La: 0.086 | Conforming steel |
| D | 0.013 | 0.15 | 0.12 | 0.024 | 0.001 | 20.3 | 5.27 | 0.15 | 0.005 | Zr: 0.04, B: 0.0008 | Conforming steel |
| E | 0.005 | 0.15 | 0.10 | 0.025 | 0.001 | 20.4 | 5.63 | 0.16 | 0.006 | Hf: 0.08 | Conforming steel |
| F | 0.006 | 0.18 | 0.52 | 0.023 | 0.001 | 15.5 | 4.84 | 0.15 | 0.006 | Y: 0.12, Cu: 0.03 | Conforming steel |
| G | 0.007 | 0.14 | 0.12 | 0.024 | 0.002 | 29.3 | 5.32 | 0.15 | 0.017 | Zr: 0.04, B: 0.0031 Ca: 0.0024, Mg: 0.0014 | Conforming steel |
| H | 0.008 | 0.15 | 0.11 | 0.023 | 0.002 | 11.3 | 5.54 | 0.22 | 0.018 | Ti: 0.15, W: 3.23 | Conforming steel |
| I | 0.006 | 0.15 | 0.12 | 0.023 | 0.001 | 20.5 | 4.13 | 0.46 | 0.005 | Mo: 0.08, Zr: 0.15, La: 0.087 | Conforming steel |
| J | 0.005 | 0.84 | 0.10 | 0.023 | 0.002 | 11.2 | 6.38 | 0.15 | 0.008 | Zr: 0.06, Nb: 0.18 | Conforming steel |
| K | 0.005 | 0.16 | 0.12 | 0.024 | 0.001 | 20.5 | 5.22 | 0.14 | 0.006 | V: 0.10, Ce: 0.05, La: 0.02, Nd: 0.02 | Conforming steel |
| L | 0.005 | 0.15 | 0.12 | 0.023 | 0.002 | 18.8 | 0.03 | 0.15 | 0.008 | Zr: 0.04, La: 0.12 | Conforming steel |
| M | 0.005 | 0.14 | 0.11 | 0.023 | 0.002 | 21.3 | 1.53 | 0.16 | 0.008 | Zr: 0.05, La: 0.11 | Conforming steel |
| N | 0.006 | 0.16 | 0.11 | 0.024 | 0.001 | 20.2 | <u>7.51</u> | 0.16 | 0.005 | — | Comparative steel |
| O | 0.005 | 0.14 | 0.10 | 0.025 | 0.002 | 20.3 | <u>5.81</u> | 0.15 | 0.005 | Cu: 0.03, Zr: 0.04, La: 0.085 | Conforming steel |
| P | 0.005 | 0.15 | 0.11 | 0.022 | 0.001 | 20.1 | 5.75 | 0.16 | 0.006 | Cu: 0.08, Mo: 3.02, Zr: 0.03, La: 0.068 | Conforming steel |

Underlines indicate outside the range according to the present disclosure.

TABLE 2

Al coating layer-equipped stainless steel sheet

Al coating layer

| No. | Steel ID | Pre-heat treatment conditions Treatment temperature (° C.) | Pre-heat treatment conditions Treatment time (sec) | Thickness of base steel sheet (μm) | Thickness per one side (μm) | First depth position on first side Fe content (mass %) | First depth position on first side Cr content (mass %) | First depth position on first side Total content of Fe and Cr (mass %) | First depth position on second side (opposite to first side) Fe content (mass %) | First depth position on second side (opposite to first side) Cr content (mass %) | First depth position on second side (opposite to first side) Total content of Fe and Cr (mass %) | Remarks |
|---|---|---|---|---|---|---|---|---|---|---|---|---|
| 1 | A | 800 | 40 | 50 | 3.0 | 40 | 16 | 56 | 42 | 18 | 60 | Example |
| 2 | A | Not treated | Not treated | 50 | 3.0 | 3 | 1 | <u>4</u> | 3 | 2 | <u>5</u> | Comparative Example |
| 3 | B | 800 | 40 | 50 | 5.0 | 40 | 14 | 54 | 37 | 15 | 52 | Example |
| 4 | B | 600 | 40 | 50 | 5.1 | 2 | 1 | <u>3</u> | 3 | 2 | <u>5</u> | Comparative Example |
| 5 | B | 1100 | 40 | 50 | 5.0 | 68 | 17 | <u>85</u> | 66 | 16 | <u>82</u> | Comparative Example |
| 6 | B | 800 | 80 | 50 | 4.9 | 59 | 21 | <u>80</u> | 56 | 19 | <u>75</u> | Comparative Example |
| 7 | B | Not treated | Not treated | 50 | 5.0 | 2 | 1 | <u>3</u> | 2 | 1 | <u>3</u> | Comparative Example |
| 8 | B | 700 | 15 | 30 | 1.1 | 18 | 7 | 25 | 16 | 8 | 24 | Example |
| 9 | B | 800 | 40 | 50 | 4.8 | 38 | 15 | 53 | 41 | 17 | 58 | Example |
| 10 | B | 800 | 55 | 80 | 6.2 | 51 | 13 | 64 | 53 | 12 | 65 | Example |
| 11 | B | 920 | 20 | 100 | 9.8 | 41 | 20 | 61 | 43 | 22 | 65 | Example |
| 12 | C | 800 | 40 | 50 | 5.0 | 38 | 13 | 51 | 36 | 13 | 49 | Example |
| 13 | D | 800 | 40 | 50 | 4.9 | 31 | 18 | 49 | 33 | 20 | 53 | Example |
| 14 | E | 800 | 40 | 50 | 5.0 | 45 | 10 | 55 | 42 | 9 | 51 | Example |
| 15 | F | 800 | 40 | 50 | 6.5 | 33 | 9 | 42 | 35 | 11 | 46 | Example |
| 16 | G | 800 | 40 | 50 | 5.1 | 40 | 20 | 60 | 38 | 19 | 57 | Example |
| 17 | H | 800 | 40 | 50 | 5.0 | 51 | 10 | 61 | 48 | 12 | 60 | Example |
| 18 | I | 800 | 40 | 50 | 6.8 | 35 | 19 | 54 | 35 | 20 | 55 | Example |
| 19 | J | 800 | 40 | 50 | 5.0 | 36 | 7 | 43 | 39 | 8 | 47 | Example |
| 20 | K | 800 | 40 | 50 | 5.0 | 48 | 10 | 58 | 46 | 9 | 55 | Example |
| 21 | L | 800 | 40 | 50 | 2.8 | 30 | 17 | 47 | 28 | 15 | 43 | Example |
| 22 | M | 800 | 40 | 50 | 3.5 | 41 | 18 | 59 | 40 | 21 | 61 | Example |
| 23 | <u>N</u> | Cracking occurred in hot rolling | | | | | | | | | | Comparative Example |
| 24 | O | 800 | 40 | 50 | 4.8 | 43 | 15 | 58 | 48 | 16 | 64 | Example |
| 25 | P | 800 | 40 | 50 | 5.2 | 35 | 13 | 48 | 40 | 15 | 55 | Example |

Underlines indicate outside the range according to the present disclosure.

TABLE 3

Chemical composition of Al-containing stainless steel sheet (mass %)

| No. | C | Si | Mn | P | S | Cr | Al | Ni | N | Others | Remarks |
|---|---|---|---|---|---|---|---|---|---|---|---|
| 1 | 0.005 | 0.13 | 0.10 | 0.023 | 0.001 | 20.0 | 9.63 | 0.11 | 0.005 | — | Example |
| 2 | | | | | | | — | | | | Comparative Example |
| 3 | 0.004 | 0.11 | 0.09 | 0.021 | 0.001 | 19.8 | 11.1 | 0.13 | 0.005 | Zr: 0.02, La: 0.067 | Example |
| 4 | | | | | | | — | | | | Comparative Example |
| 5 | | | | | | | — | | | | Comparative Example |
| 6 | | | | | | | — | | | | Comparative Example |
| 7 | | | | | | | — | | | | Comparative Example |
| 8 | 0.003 | 0.13 | 0.10 | 0.021 | 0.001 | 19.8 | 8.51 | 0.14 | 0.005 | Zr: 0.03, La: 0.075 | Example |
| 9 | 0.004 | 0.12 | 0.09 | 0.022 | 0.001 | 19.3 | 10.9 | 0.13 | 0.004 | Zr: 0.02, La: 0.067 | Example |
| 10 | 0.004 | 0.13 | 0.08 | 0.020 | 0.001 | 19.5 | 11.2 | 0.12 | 0.004 | Zr: 0.02, La: 0.057 | Example |
| 11 | 0.004 | 0.14 | 0.10 | 0.021 | 0.001 | 19.7 | 10.7 | 0.14 | 0.004 | Zr: 0.02, La: 0.069 | Example |
| 12 | 0.004 | 0.11 | 0.08 | 0.021 | 0.001 | 19.5 | 12.3 | 0.12 | 0.004 | Mo: 3.01, Zr: 0.03, La: 0.072 | Example |
| 13 | 0.012 | 0.13 | 0.10 | 0.022 | 0.001 | 19.8 | 10.4 | 0.13 | 0.004 | Zr: 0.03, B: 0.0006 | Example |
| 14 | 0.004 | 0.14 | 0.07 | 0.023 | 0.001 | 19.9 | 11.1 | 0.14 | 0.005 | Hf: 0.07 | Example |
| 15 | 0.004 | 0.16 | 0.51 | 0.020 | 0.001 | 15.0 | 12.1 | 0.13 | 0.004 | Y: 0.11, Cu: 0.02 | Example |
| 16 | 0.006 | 0.13 | 0.11 | 0.021 | 0.002 | 28.9 | 12.1 | 0.14 | 0.016 | Zr: 0.02, B: 0.0029 Ca: 0.0019, Mg: 0.0010 | Example |
| 17 | 0.007 | 0.14 | 0.10 | 0.022 | 0.001 | 10.9 | 11.7 | 0.19 | 0.015 | Ti: 0.14, W: 3.12 | Example |
| 18 | 0.005 | 0.13 | 0.10 | 0.020 | 0.001 | 20.1 | 12.8 | 0.44 | 0.005 | Mo: 0.05, Zr: 0.14, La: 0.081 | Example |
| 19 | 0.004 | 0.81 | 0.08 | 0.021 | 0.001 | 10.8 | 11.2 | 0.14 | 0.006 | Zr: 0.04, Nb: 0.15 | Example |
| 20 | 0.004 | 0.14 | 0.10 | 0.022 | 0.001 | 20.2 | 10.7 | 0.12 | 0.006 | V: 0.09, Ce: 0.04, La: 0.01, Nd: 0.01 | Example |

TABLE 3-continued

| | Chemical composition of Al-containing stainless steel sheet (mass %) | | | | | | | | | |
|---|---|---|---|---|---|---|---|---|---|---|
| No. | C | Si | Mn | P | S | Cr | Al | Ni | N | Others | Remarks |
| 21 | 0.004 | 0.13 | 0.10 | 0.020 | 0.001 | 18.5 | 4.25 | 0.13 | 0.008 | Zr: 0.04, La: 0.10 | Example |
| 22 | 0.003 | 0.11 | 0.09 | 0.021 | 0.001 | 20.8 | 5.83 | 0.15 | 0.005 | Zr: 0.03, La: 0.09 | Example |
| 23 | Cracking occurred in hot rolling | | | | | | | | | | Comparative Example |
| 24 | 0.004 | 0.13 | 0.08 | 0.023 | 0.002 | 19.5 | 10.8 | 0.14 | 0.003 | Cu: 0.02, Zr: 0.03, La: 0.074 | Example |
| 25 | 0.004 | 0.13 | 0.09 | 0.019 | 0.001 | 19.3 | 11.3 | 0.12 | 0.004 | Cu: 0.05, Mo: 2.46, Zr: 0.02, La: 0.056 | Example |

TABLE 4

| | Evaluation results | | | | |
|---|---|---|---|---|---|
| No. | (1) Adhesion | (2) Workability | (3) Oxidation resistance | (4) Electrical resistivity | Remarks |
| 1 | ○ | ○ | ○ | ◎ | Example |
| 2 | X | ○ | Evaluation omitted | | Comparative Example |
| 3 | ○ | ○ | ◎ | ◎ | Example |
| 4 | X | ○ | Evaluation omitted | | Comparative Example |
| 5 | ○ | X | Evaluation omitted | | Comparative Example |
| 6 | ○ | X | Evaluation omitted | | Comparative Example |
| 7 | X | ○ | Evaluation omitted | | Comparative Example |
| 8 | ○ | ○ | ◎ | ◎ | Example |
| 9 | ○ | ○ | ◎ | ◎ | Example |
| 10 | ○ | ○ | ◎ | ◎ | Example |
| 11 | ○ | ○ | ◎ | ◎ | Example |
| 12 | ○ | ○ | ◎ | ◎ | Example |
| 13 | ○ | ○ | ◎ | ◎ | Example |
| 14 | ○ | ○ | ◎ | ◎ | Example |
| 15 | ○ | ○ | ◎ | ◎ | Example |
| 16 | ○ | ○ | ◎ | ◎ | Example |
| 17 | ○ | ○ | ◎ | ◎ | Example |
| 18 | ○ | ○ | ◎ | ◎ | Example |
| 19 | ○ | ○ | ◎ | ◎ | Example |
| 20 | ○ | ○ | ◎ | ◎ | Example |
| 21 | ○ | ○ | ○ | ○ | Example |
| 22 | ○ | ○ | ◎ | ○ | Example |
| 23 | Cracking occurred in hot rolling | | | | Comparative Example |
| 24 | ○ | ○ | ◎ | ◎ | Example |
| 25 | ○ | ○ | ◎ | ◎ | Example |

As can be understood from Table 4, in all Examples, the adhesion and the workability were excellent, and favorable oxidation resistance and electrical resistivity were obtained after the diffusion heat treatment.

In all Comparative Examples, on the other hand, cracking occurred in hot rolling and test pieces could not be produced, or at least one of the adhesion, the workability, the oxidation resistance, and the electrical resistivity was insufficient.

The invention claimed is:

1. An Al coating layer-equipped stainless steel sheet comprising:
 a base steel sheet; and
 an Al coating layer on a surface of the base steel sheet, wherein the base steel sheet is a stainless steel sheet having a thickness of 100 μm or less and a chemical composition containing, in mass %,
 C: 0.030% or less,
 Si: 1.00% or less,
 Mn: 1.00% or less,
 P: 0.040% or less,
 S: 0.010% or less,
 Cr: 11.0% to 30.0%,
 Al: 1.53% to 6.50%,
 Ni: 0.01% to 0.50%, and
 N: 0.020% or less,
 with a balance consisting of Fe and inevitable impurities,
 a thickness of the Al coating layer is 0.5 μm to 3.5 μm, and
 a total content of Fe and Cr at a first depth of the Al coating layer is 20 mass % to 70 mass %,
 where the first depth of the Al coating layer is a depth of (depth a +depth b)/2 from a surface of the Al coating layer,
 the depth a is a depth at which an Al strength is [maximum Al strength]/2, in a depth region from the surface of the Al coating layer to a point A of an Al concentration profile in a depth direction, the point A being a depth at which the Al strength is the maximum Al strength in the Al concentration profile, and
 the depth b is a depth at which the Al strength is ([maximum Al strength]+[Al strength corresponding to the Al content in the base steel sheet])/2, in a depth region from the point A to an interface between the base steel sheet and the Al coating layer of the Al concentration profile.

2. The Al coating layer-equipped stainless steel sheet according to claim 1, wherein the chemical composition of the base steel sheet further contains, in mass %, one or more selected from the group consisting of
 Cu: 0.10% or less,
 Ti: 0.50% or less,
 Nb: 0.50% or less,
 V: 0.50% or less,
 Zr: 0.20% or less,
 Hf: 0.20% or less,
 Mo: 6.00% or less,
 W: 6.00% or less,
 B: 0.0050% or less,
 REM: 0.20% or less,
 Ca: 0.0100% or less, and
 Mg: 0.0100% or less.

* * * * *